United States Patent [19]

Kikuhara

[11] 4,165,386
[45] Aug. 21, 1979

[54] BREAD AND A METHOD OF PRODUCING THE SAME

[76] Inventor: Iwao Kikuhara, 1516-1, Furumitsu-cho, Matsuyama-shi; Ehime-ken, Japan

[21] Appl. No.: 800,856

[22] Filed: May 26, 1977

Related U.S. Application Data

[63] Continuation-in-part of Ser. No. 737,381, Nov. 1, 1976, abandoned.

[30] Foreign Application Priority Data

Nov. 4, 1975 [JP] Japan .................. 50/132284

[51] Int. Cl.² .............................................. A21D 2/08
[52] U.S. Cl. ........................................ 426/9; 426/17; 426/25; 426/532
[58] Field of Search ................... 426/25, 17, 9, 532

[56] References Cited

U.S. PATENT DOCUMENTS

| | | | |
|---|---|---|---|
| 1,148,815 | 8/1915 | Alexander | 426/25 |
| 1,929,829 | 10/1933 | Shroyer | 426/25 |
| 3,826,850 | 7/1974 | Shenkenberg et al. | 426/25 |

OTHER PUBLICATIONS

Kirby et al., Further Studies on the Growth of Bread Molds as Influenced by Acidity, *Cereal Chem.*, vol. 14, No. 6, Nov. 1937, pp. 865–878.
Baking Science and Technology, Pyler, 1973, vol. I, Publ. by Siebel Publ. Co.: Chicago, pp. 216–217.
Bakery Materials and Methods, Daniel, 1963, Publ. by Maclaren & Sons, Ltd.: London, p. 170.
Baking Science and Technology, Matz, 1960, The Avi Publ. Co., Inc., Westport, Conn., pp. 90–91.
Baking Science and Technology, Pyler, 1952, Vol. II, Publ. by Siebel Publ. Co.: Chicago, Ill., p. 771.
Commercial Fruits and Vegetable Products, Cruess, 1938, McGraw-Hill Book Co., Inc.: New York, pp. 538–539.
The Technology of Wine Making, Amerine et al., 2nd Ed., 1967, The Avi Publ. Co., Inc.: Westport, Conn., pp. 163, 662–664.

*Primary Examiner*—Joseph M. Golian
*Attorney, Agent, or Firm*—Flynn & Frishauf

[57] ABSTRACT

Flour bread or rye bread containing a suitable amount of rice vinegar. The production steps of the bread comprise adding rice vinegar to flour or rye powder together with a predetermined amount of water in the dough kneading step in an amount of 180ml to 450ml relative to 25kg of the powder, followed by fermenting and, then, baking the dough.

4 Claims, No Drawings

BREAD AND A METHOD OF PRODUCING THE SAME

CROSS REFERENCE TO THE RELATED-APPLICATION

This is a continuation-in-part application of U.S. patent application Ser. No. 737,381 filed Nov. 1, 1976 (abandoned).

This invention relates to bread good in preservation capability without adding any synthetic preservative such as an anti-mold agent as well as in cellular structure, flavor, nutritive value, etc., and a method of producing the same.

Bread is porous and contains an appropriate amount of water, providing a good condition for the growth of mold. Accordingly, it is spoiled in as little as about one day after the production particularly in a hot, humid season. This presents a serious problem because it is necessary to prevent bread from quality deterioration, mold growth, etc., for at least three days after the production in view of the time required for transportation and comsumption of the bread. To solve the problem, an anti-mold agent of sodium propionate or calcium propionate is added in general to flour in an amount of about 50 g relative to 25 kg of flour. But, an anti-mold agent of this kind obstructs the dough fermentation and spoils the bread flavor. Clearly, it is desired not to use an anti-mold agent of this kind, if possible.

This invention has been achieved to remove the drawback mentioned. Specifically, this invention is intended to provide bread quite free of conventional anti-mold agent and yet good in preservation capability as well as in cellular structure, flavor, nutritive value, etc. and a method of producing the same. More in detail, this invention provides bread comprising rice vinegar and at least one kind of bread-making powder selected from the group of flour and rye powder, the amount of the rice vinegar ranging from 180 ml to 450 ml relative to 25 kg of the bread-making powder. This invention also provides a method of producing bread, featured in that rice vinegar is added together with a predetermined amount of water to at least one kind of bread-making powder selected from the group of flour and rye powder in the dough kneading step in an amount of 180 ml to 450 ml relative to 25 kg of the bread-making powder followed by fermentation of the kneaded dough and subsequent baking.

In an attempt to remove the prescribed drawback, I have added an appropriate amount of rice vinegar together with water to bread-making powder in the dough preparation step and produced bread by the usual method, with the result that fermentation of the dough was found much improved. In addition, marked improvements were recognized in cellular structure and flavor of the product bread. What is also important is that the preservation capability of the product bread was found prominently improved in spite of the fact that no conventional preservative such as an anti-mold agent was added to the dough. Incidentally, it is known to the art that glacial acetic acid is added to flour in an amount of about 0.15% based on the weight of the flour in order to prevent rope bacteria generation on the product bread. But, glacial acetic acid is known to be detrimental to the dough and the bread quality or enhance the sourness of bread. Moreover, it is said that a satisfactory anti-mold effect can not be expected of glacial acetic acid.

The rice vinegar used in this invention is prepared as follows. In the first step, unhulled unpolished rice is polished with a rice-polishing machine. It is preferred that 0.1 to about 15% by weight of the rice skin be removed in the rice-polishing treatment. Incidentally, about 30 to 50% by weight of the rice skin is removed in the case of producing a refined sake, which is a Japanese alcoholic beverage. But, too much polishing results in the loss of the rice nutrient such as protein and vitamins and, thus, is not preferred in the production of rice vinegar. Only a slight scratching of the skin brings about 0.1% by weight of the skin removal of the unhulled unpolished rice. In this case, the embryo bud of the rice remains unremoved, leading to the production of a concentrated rice vinegar rich in nutrients, though it is somewhat difficult to carry out fermentation of the rice satisfactorily.

The rice thus polished is water-washed and immersed in water for about 20 hours, followed by draining of the rice fully absorbing water and subsequent steaming of the rice so as to convert the starch of the rice into $\alpha$-type. The steamed rice is gradually cooled down to 35° C. to 38° C. and, then, put in a koji-producing chamber.

Seed of koji mold such as aspergillus oryzae is added to the steamed rice for multiplication of the koji mold so as to prepare koji. On the other hand, "Shubo", namely, the substance from which sake is prepared, is separately prepared by adding lactic acid or lactobacilli and yeast to a mixture of steamed rice, koji and water, followed by fermentation. Lactic acid is used because the optimum pH for the multiplication of yeast is slightly acidic. The resultant Shubo, which is obtained after about 20 days of fermentation, contains about 300 millions of yeast fungi per cubic centimeter of the Shubo.

Steamed rice, koji and water are newly added to the Shubo, which is generally called "an initial addition". The day after the initial addition, "an intermediate addition" is carried out as in the initial addition. Likewise, "a binal addition" is conducted the day after the intermediate addition. In short, steamed rice, koji and water are added to the Shubo in three steps. This method is very effective for producing a large amount of sake with a small amount of yeast.

After the binal addition, the resultant mixture is subjected to alcoholic fermentation while being saccharified. It is necessary in this step to keep the fermentation temperature higher than for the case of producing a refined sake in order to permit a sufficient decomposition of the raw material. Unrefined sake having an alcohol content of about 18% is produced after about 25 days of fermentation. Vinegar is added to the unrefined sake, followed by squeezing the mixture so as to separate the mixture into liquor and lees. The separated liquor is subjected to aging for about one month. The aged liquor is diluted with water to an extent permitting acetic acid fermentation and, then, vinegar seed and acetic acid bacteria are added to the diluted liquid, thereby performing acetic acid fermentation and producing the desired product of rice vinegar.

The acetic acid fermentation can be carried out by either a submerged culture method or by leaving the mixture at rest for a long time. Although the submerged culture method permits a rapid fermentation, it is preferred to leave the mixture at rest for a long time for the purpose of carrying out acetic acid fermentation very slowly. A slow fermentation enables the product rice vinegar to contain larger amounts of extract, amino acids and other organic acids. It is particularly important to note that the slow fermentation is advantageous over the submerged culture method in terms of the ratio of non-volatile acids to volatile acids contained in the product rice vinegar.

The resultant rice vinegar is featured in that the free amino acid content is 250 mg/l or more and the extract content is 2.5% or more. It is quite reasonable to think that various nutrients such as vitamins $B_1$, $B_2$, $B_6$, $B_{12}$, calcium pantothenate, nicotinic acid amide, folic acid, peptides, inositol, choline and biotin are formed by the action of microorganisms added in the manufacturing step of the rice vinegar such as koji mold, lactic acid bacteria, yeast, and acetic acid bacteria. In the present invention, these nutrients are supposed to play vital roles in the production of bread.

Accordingly, the term "rice vinegar" as used in the specification should be understood to mean only that which is prepared as described above and contains at least 250 mg/l or more of free amino acid.

Clearly, the rice vinegar used in this invention widely differs from an ordinary fruit vinegar or grain vinegar in, particularly, the content of free amino acid and extract. The ordinary fruit vinegar or grain vinegar is prepared by subjecting cider, malt, corn, etc. to fermentation for saccharification, followed by alcoholic fermentation and subsequent acetic acid fermentation by adding vinegar seed. Generally, the resultant vinegar is not satisfactorily high in free amino acid content, for example, the maximum content being as low as about 180 mg/l.

Indeed, a conventional edible vinegar such as fruit vinegar or grain vinegar may produce an anti-mold effect and serve to prevent rope bacteria generation on the product bread to source extent. Such a vinegar, however, is incapable of overcoming the greatest difficulty inherent in the bread produced by the conventional method. Namely, the problem of acid smell and sourness of bread remains unsolved, resulting in markedly impaired taste of bread. It follows that such a conventional edible vinegar is scarcely utilized at present for the production of bread.

The rice vinegar used in this invention is far superior to the conventional edible vinegar in its anti-mold effect and its function of preventing rope bacteria generation on the product bread. In addition, the product bread is enabled to exhibit prominently improved flavor and cellular structure. It is quite impossible to infer the particular effects inherent in the rice vinegar from the conventional edible vinegar.

The amount of rice vinegar added to the dough should be 180 ml to 450 ml, preferably, 260 ml to 300 ml, relative to 25 kg of flour or rye powder. A value below 180 ml fails to enable the product bread to exhibit a satisfactory anti-mold property. On the other hand the vinegar added in an amount 450 ml tends to deteriorate the bread quality.

As described previously, a predetermined amount of rice vinegar is simply added to the bread-making powder together with water in the dough kneading step in a dough making method such as direct kneading method, sponge and dough method, preferment and dough method or continuous process. What is important in this step is that rice vinegar should be added in a manner not to deteriorate the yeast. The dough thus prepared is subjected to fermentation, degassing, shaping and, then, baking in usual manner so as to obtain the aimed bread.

To reiterate, this invention is featured in that a suitable amount of rice vinegar is added to the dough, thereby enabling the product bread to be excellent in preservation capability. Specifically, the product bread is enabled to be low in mold growth rate, aging speed, etc. without using conventional synthetic preservatives such an antiseptic agents and anti-mold agent. In addition, the use of rice vinegar serves to lower the pH of the dough by 0.2 to 0.3, rendering the dough optimum for multiplication of yeast. It follows that fermentation of the dough is facilitated, resulting in the product bread with uniform cellulcar structure.

Further, rice vinegar promotes the sterilization of the dough in the baking step. It has been clarified that the number of bacteria living in the bread containing rice vinegar is decreased to a half to one third of the case where no preservative is used.

An additional merit to be noted is that rice vinegar is rich in free amino acid, nutritive components, etc.

Thus, the use of rice vinegar produces the following effects in the manufacture of bread:

(1) Dispersion in a dough is good.
(2) Buffering capacity is increased, which contributes to the control and stabilization of pH in dough.
(3) Elastic and extensible properties are imparted to a dough, thus facilitating the handling of the dough.
(4) Proofing time is shorten.
(5) Loaf volume is slightly increased.
(6) Characteristics of crust: A very light and nice golden brown color and improved tenderness.
(7) Grain size is uniform, thus providing tenderness and luricity crumb.
(8) Flavor is excellent and mild.
(9) Eating quality, deliciousness and mouth-feel are improved.
(10) Shelf-life (or anti-staling functionality): Bread is kept unfirm a few days longer than with ordinary vinegars.
(11) Vinegar used in this invention does not impart sourness to the product bread unlike the conventional synthetic or natural vinegar.

Needless to say, additives used in general method of producing bread such as sugar, shortening and powdered milk may also be used in this invention. Likewise, it is all right in this invention to mix a powder of other cereals such as rice and soy beans into flour or rye powder.

EXAMPLE 1

Various kinds of bread were produced by sponge and dough method using 100 kg of a high-strength flour (1st class). Specifically, various additives including rice vinegar, synthetic vinegar and anti-mold agent were added in the dough preparation step together with water in amounts as shown in Table 1. For the purpose of comparison, the experiments include a case where no additive was used.

In adding rice vinegar, etc., the mixture was slightly kneaded, followed by hard kneading for preparation of the dough. When the dough was subjected to fermentation and baking by the usual method so as to obtain 170 kg of bread for each case. The compositions of various vinegar used in this Example were as follows. The percentage shown is on a weight basis.

| Concentrated rice vinegar | |
|---|---|
| pH | 2.40 |

-continued

| | |
|---|---|
| Total acid | more than 5.0% |
| Alcohol | 0.137% |
| Total nitrogen | 0.051% |
| Protein | 0.320% |
| Sugar | 2.01% |
| NaCl | 0.58% |
| Formol nitrogen | 0.015% |
| Extract | 1.662% |
| Free amino acid | 425.0 mg/l |
| Ordinary rice vinegar | |
| pH | 2.40 |
| Total acid | 4.63% |
| NaCl | 1.389% |
| Total nitrogen | 0.0512% |
| Protein | 0.320% |
| Nitrogen (in the state of amino compound) | 0.0153% |
| Sugar | 0.073% |
| Alcohol | 0.091% |
| Extract | 0.465% |
| Free amino acid | 85 mg/l |

On the other hand, composition of the synthetic vinegar used in this Example was as follows (the values shown denote the amounts contained in 100 l of the synthetic vinegar):

| | |
|---|---|
| Glacial acetic acid (99% purity) | 4,600 ml |
| Saccharin | 2.8 g |
| Dulcin | 2.5 g |
| Amino acid (having two nitrogen atoms) | 260 ml |
| NaCl | 200 g |
| Succinic acid | 15 g |
| Glycerine | 22 ml |
| Water | 95 l |
| Perfume | 5.6 ml |

The following Table 1 shows the results of the experiments.

Table 1 shows that the product bread was kept free of mold growth for at least three days for the cases of Sample 1 (concentrated rice vinegar), Sample 3 (ordinary rice vinegar), Sample 4 (anti-mold agent) and Sample 5 (synthetic vinegar). Particularly, Sample 1 prepared by adding concentrated rice vinegar, in amounts specified in this invention was kept free of mold growth for 3.5 days or more. In contrast, mold was seen to grow on Sample 6 (no additive case) only one day after the manufacture. Incidentally, Sample 2 in which concentrated rice vinegar was added in an amount below the range specified in this invention was kept free of mold growth for 2.5 days.

For every case of using the additive, the mold growth on the product bread was found to consist essentially of aspergillus niger which is an acid-fast bacteria. It was also found that the pH of bread bearing mold had been lowered to about 4.0 to 5.0.

Table 1 also shows that the dough fermentation capability was good for the cases of adding concentrated rice vinegar, and ordinary rice vinegar. The vinegar mentioned contains various kinds of amino acids and other nutritive components required for fermentation multiplication of bread yeast. This clearly suggests the reason for the good dough fermentation capability. It is interesting to note in this connection that the fermentative multiplication of yeast was prevented to some extent for the cases of adding calcium propionate as an anti-mold agent and synthetic vinegar.

Further, Sample 1 using concentrated rice vinegar, was very uniform in cellular structure of the product bread and showed marked improvements in flavor and taste of the product bread. In contrast, the product bread for the cases of adding the anti-mold agent and synthetic vinegar was found non-uniform in cellular structure and had a smell of acid. In addition, the product bread was sour.

Table 1 further shows that concentrated rice vinegar, having a larger free amino acid content than ordinary Table 1

| Sample* | Mold-Free Days | Dough* Fermentation | pH Dough | pH Bread | Product Bread Properties |
|---|---|---|---|---|---|
| 1 | 3.5 or more | good | 5.17 | 5.13 | Very good in flavor, cellular structure, tongue-feel and taste |
| 2 | 2.5 | good | 5.24 | 5.21 | Good in flavor, cellular structure tongue-feel and taste |
| 3 | 3 or more | good | 5.19 | 5.17 | " |
| 4 | 3 | bad | 5.22 | 5.18 | Having smell of acid. Sour. Bad in cellular structure and tongue-feel |
| 5 | 3 | slightly good | 5.17 | 5.12 | Slightly sour. Bad in cellular structure |
| 6 | 1 | | 5.45 | 5.40 | Slightly good in flavor and cellular structure |

Note:
*Sample 1 Concentrated rice vinegar was added in an amount of 230 ml relative to 25 kg of flour.
 Sample 2 Concentrated rice vinegar was added in an amount of 150 ml relative to 25 kg of flour. (The amount of vinegar is smaller than specified in this invention.)
Sample 3 Ordinary rice vinegar containing 85 mg/l of amino acid was added in an amount of 230 ml relative to 25 kg of flour.
 Sample 4 Calcium propionate was added in an amount of 50g relative to 25 kg of flour.
 Sample 5 Synthetic vinegar was added in an amount of 230ml relative to 25 kg of flour.
Sample 6 No additive was used.
**Product bread simply packed in polypropylene film 0.035 mm thick was allowed to stand in the air, 31° to 32° C. in temperature and 80% in humidity, for observation of the mold-free days.
***Water three times as much in volume as the dough was added and the mixture was sufficiently stirred for emulsification. The dough fermentation capability was determined by observing the bobbling degree of the emulsion.

rice vinegar, is preferred to ordinary rice vinegar in terms of anti-mold effect, flavor, cellular structure, tongue-feel and taste of the product bread.

EXAMPLE 2

Using 100 kg of a high-strength flour (1st class), bread was produced by direct kneading method. In this case, 1,080 ml of rice vinegar whose skin was removed about 0.3 weight % was added together with water to prepare the dough followed by fermenting and baking the dough in the usual method, thereby producing 167 kg of bread. The composition of the unpolished rice vinegar used in this Example was as follows:

| | |
|---|---|
| pH | 2.95 |
| Total acid | 6.533% |
| NaCl | 0.812% |
| Total nitrogen | 0.201% |
| Formol nitrogen | 0.108% |
| Protein | 0.674% |
| Sugar | 2.490% |
| Alcohol | 0.496% |
| Extract | 3.61% |
| Free amino acid | 350 mg/l |

The dough fermentation capability was found to be very good. In addition, the product bread was very uniform in cellular structure and showed remarkable improvements in flavor and tongue-feel.

The bread thus produced was packed in a polypropylene film having a thickness of 0.02 mm and stored under a temperature of 30° to 33° C. and a humidity of 80%, with the result that neither mold growth nor quality deterioration was recognized for 3.5 days.

What is claimed is:

1. Bread comprising at least one kind of bread-making powder selected from the group of flour and rye powder, and rice vinegar containing at least 250 mg/l of free amino acid, said rice vinegar being prepared by mixing a vinegar seed and water to sake which is made by subjecting a mixture of Shubo, steamed rice and koji to alcoholic fermentation while being saccharified, the amount of the rice vinegar ranging from 180 ml to 450 ml relative to 25 kg of the bread-making powder.

2. Bread according to claim 1, wherein the rice vinegar is at least one kind selected from the group of concentrated rice vinegar and unpolished rice vinegar.

3. Bread according to claim 1, wherein the amount of the rice vinegar ranges from 260 ml to 300 ml relative to 25 kg of the bread-making powder.

4. A method of producing bread, comprising adding at least one kind of rice vinegar containing at least 250 mg/l of free amino acid, said rice vinegar being prepared by mixing a vinegar seed and water with sake which is made by subjecting a mixture of Shubo, steamed rice and koji to alcoholic fermentation while being saccharified, to at least one bread-making powder selected from the group consisting of flour and rye in an amount of between 180 ml and 450 ml relative to 25 kg of the bread-making powder in the dough kneading step, followed by fermenting, and then baking the dough.

* * * * *